United States Patent
Keating

(10) Patent No.: US 11,252,868 B2
(45) Date of Patent: Feb. 22, 2022

(54) LANDSCAPE TRIMMING TOOL ATTACHMENT DEVICE

(71) Applicant: Tree Well Wizard, LLC, Murrieta, CA (US)

(72) Inventor: Jon C. Keating, Murrieta, CA (US)

(73) Assignee: TREE WELL WIZARD, LLC, Murrieta, CA (US)

( * ) Notice: Subject to any disclaimer, the term of this patent is extended or adjusted under 35 U.S.C. 154(b) by 362 days.

(21) Appl. No.: 16/585,303

(22) Filed: Sep. 27, 2019

(65) Prior Publication Data

US 2021/0092899 A1   Apr. 1, 2021

(51) Int. Cl.
| | |
|---|---|
| *A01D 34/84* | (2006.01) |
| *A01D 34/00* | (2006.01) |
| *A01D 34/82* | (2006.01) |
| *A01D 34/86* | (2006.01) |
| *A01G 3/06* | (2006.01) |
| *A01D 34/416* | (2006.01) |
| *A01D 101/00* | (2006.01) |

(52) U.S. Cl.
CPC .......... *A01D 34/84* (2013.01); *A01D 34/001* (2013.01); *A01D 34/416* (2013.01); *A01D 34/82* (2013.01); *A01D 34/863* (2013.01); *A01G 3/062* (2013.01); *A01D 34/866* (2013.01); *A01D 2101/00* (2013.01)

(58) Field of Classification Search
CPC ...... A01B 1/246; A01D 2101/00; A01D 1/14; A01D 34/00; A01D 34/001; A01D 34/82; A01D 34/84; A01D 34/835; A01D 34/90; A01D 34/416; A01D 34/863; A01D 34/866; A01G 3/062; A01G 3/0417
See application file for complete search history.

(56) References Cited

U.S. PATENT DOCUMENTS

| | | | | |
|---|---|---|---|---|
| 2,062,820 | A | * | 12/1936 | Pierce ..................... A01D 34/90 30/276 |
| 4,049,059 | A | * | 9/1977 | Weibling ............. A01B 33/027 172/15 |
| 4,145,810 | A | * | 3/1979 | Belliston ................ A01G 3/053 30/296.1 |
| 4,531,350 | A | * | 7/1985 | Huthmacher ........ A01D 34/416 172/17 |
| 4,658,506 | A | * | 4/1987 | Nilsson ..................... B27B 9/04 30/275.4 |
| 4,756,084 | A | * | 7/1988 | Morita .................... A01G 3/062 172/15 |
| 5,010,720 | A | | 4/1991 | Corsi |
| 5,060,383 | A | * | 10/1991 | Ratkiewich ............ A01D 34/90 30/276 |
| 5,107,665 | A | * | 4/1992 | Wright ................... A01G 3/062 30/275.4 |
| 5,408,816 | A | * | 4/1995 | Cartier ................. A01D 34/001 172/17 |
| 5,884,462 | A | * | 3/1999 | Gerber ................. A01D 34/001 56/12.1 |

(Continued)

*Primary Examiner* — Adam J Behrens
(74) *Attorney, Agent, or Firm* — Benjamin Diederich

(57) ABSTRACT

A landscape trimming tool attachment device for creating circular and uniform tree wells is made up of a curved tree collar, a substantially linear extension section, and an attachment means for attaching the attachment device to a landscape trimming tool.

12 Claims, 5 Drawing Sheets

(56) References Cited

U.S. PATENT DOCUMENTS

| | | | | |
|---|---|---|---|---|
| 5,996,234 A * | 12/1999 | Fowler | ............... | A01D 34/90 30/276 |
| 6,085,503 A * | 7/2000 | Hutchinson | ......... | A01D 34/001 248/230.1 |
| 6,327,781 B1 * | 12/2001 | Sinclair | ............... | A01D 34/90 30/276 |
| 6,363,699 B1 * | 4/2002 | Wang | ............... | A01D 34/001 56/12.7 |
| 6,381,854 B1 * | 5/2002 | Pagliero | ............ | A01D 34/84 30/275.4 |
| 6,745,549 B1 * | 6/2004 | Taylor | ............... | A01D 34/001 56/12.7 |
| 7,963,041 B1 | 6/2011 | Smith | | |
| 9,433,146 B2 | 9/2016 | Hutchins | | |
| 10,555,459 B1 * | 2/2020 | Crockett | ........... | A01D 34/416 |
| 2002/0043058 A1 * | 4/2002 | McBlair | ............ | A01D 34/001 56/12.7 |
| 2003/0126749 A1 * | 7/2003 | Sanders | ............ | A01D 34/90 30/276 |
| 2004/0255471 A1 * | 12/2004 | Black | ............... | A01G 3/053 30/296.1 |
| 2009/0315283 A1 * | 12/2009 | Watkins | ............ | A01D 75/008 280/35 |
| 2013/0247386 A1 * | 9/2013 | Ishikawa | ............ | A01D 34/90 30/296.1 |
| 2018/0368314 A1 * | 12/2018 | Parsons | ............ | A01D 34/66 |
| 2019/0357436 A1 * | 11/2019 | Hamilton | ............ | A01B 1/026 |
| 2020/0367427 A1 * | 11/2020 | Cain | ............... | A01D 34/416 |

\* cited by examiner

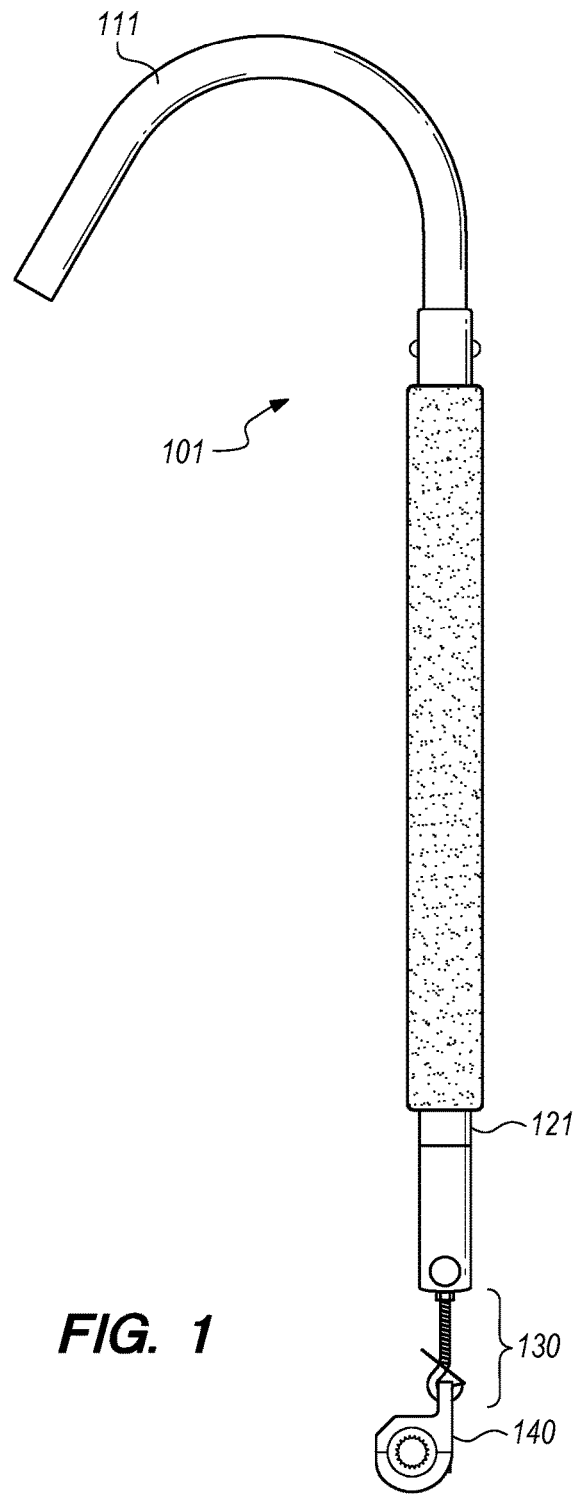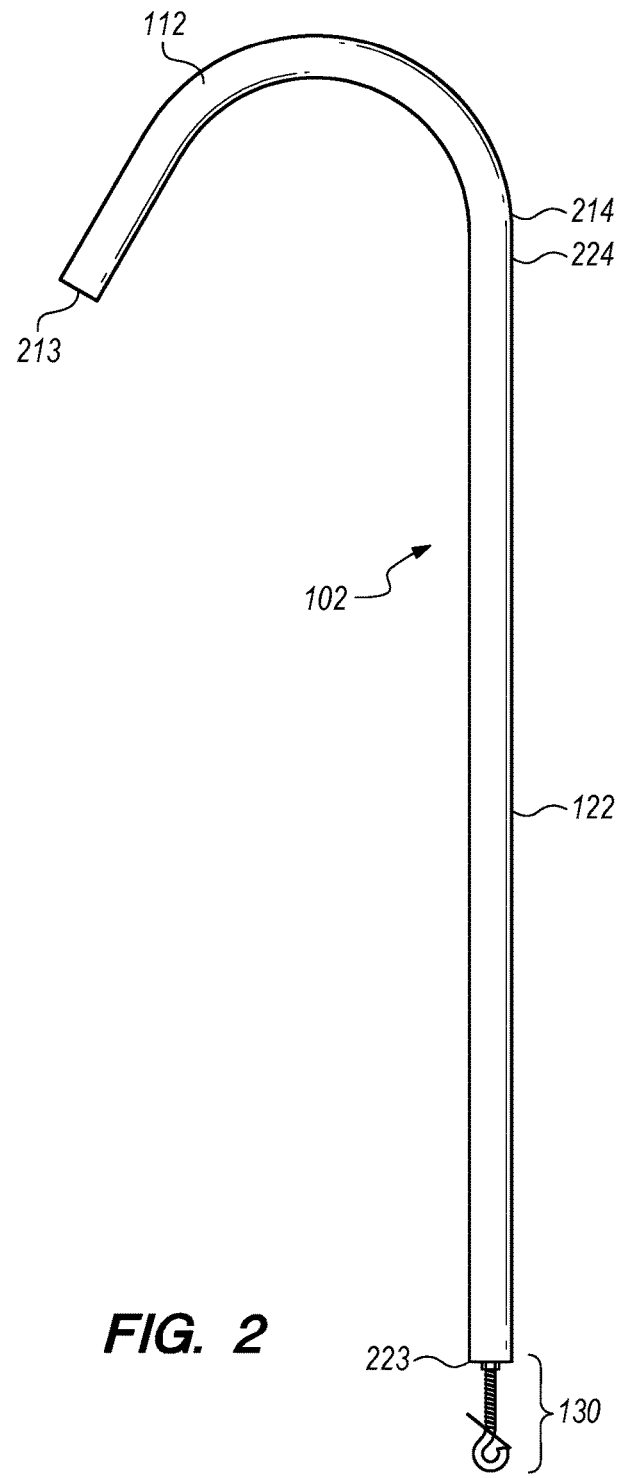
FIG. 1
FIG. 2

LANDSCAPE TRIMMING TOOL ATTACHMENT DEVICE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present disclosure relates generally to a landscaping device, and more particularly to an attachment device for landscape trimming tools to create or maintain uniform, concentric circles in turf around a tree.

In general, the circles in turf surrounding trees are commonly known as "tree wells". These tree wells are typically created by a gardener using a trimming tool, such as a string trimmer, brush-cutter, edge trimmer, lawn trimmer, or stick trimmer. Currently, the operator of the trimming tool uses a freehand method of walking around the tree and doing his or her best to maintain a concentric circle. However, this is often difficult to achieve, and typically clean concentric circles are not achieved. Additionally, it is extremely difficult under the freehand method to achieve repeatably sized wells from tree to tree. As such, in a row of trees, for example, it will be clearly obvious that the diameters of the circles are inconsistent and/or non-concentric.

In order to overcome these problems, various solutions have been introduced. For example, U.S. Pat. No. 5,010,720 discloses a trimmer guard that prevents the filament of a string trimmer from getting too close to, and thereby damaging a tree. This disclosure, however, does not allow for sufficiently large tree wells, or creation of uniformly concentric circles around a tree. U.S. Pat. No. 5,060,383 similarly discloses a guard-style device to prevent damage to a tree and/or to keep the trimming device from approaching too closely to the tree. U.S. Pat. No. 6,363,699 discloses yet another guard-style embodiment, while also serving to support the trimming tool for ease of use by the gardener. Other examples of guard-style devices to prevent damage to the tree include, U.S. Pat. Nos. 6,381,854; 7,963,041; and 9,433,146. While all of these prior disclosures show a way of keeping the trimming tool from damaging the tree by getting too close to the tree during operation, they do not show a reasonable way to extend the trimming tool away from the tree a sufficient distance and especially do not show a way of extending the trimming tool away from the tree in a manner to create uniform, concentric circle tree wells around the tree.

As such, there is a need for a device that allows the operator of a landscape trimming tool to create and maintain concentric tree wells around various trees in an efficient and uniform manner.

BRIEF SUMMARY

In accordance with one embodiment of the present disclosure, there is contemplated a landscape trimming tool attachment device. The attachment device has a telescoping extension shaft, a curved collar, and an attachment portion. The telescoping extension shaft has a proximal end and a distal end. The curved collar has a first end and a second end, with the second end connecting to the distal end of the extension shaft. The attachment portion is connected to the proximal end of the extension shaft.

The curved collar may be removably connected to the telescoping extension shaft. The attachment device may further include at least one detent and at least one notch. The at least one detent is configured to be inserted into the at least one notch when the curved collar is connected to the extension shaft, in order to secure the curved collar to the extension shaft. In one particular embodiment, the attachment device has two detents and two notches. In certain embodiments, the detents may be located in the second end of the curved collar and the notches may be located in the distal end of the extension shaft. In alternative embodiments, the curved collar may be integrally formed with the telescoping extension shaft.

The telescoping extension shaft may include a plurality of diameter markers when the shaft is extended to indicate the diameter being achieved. The attachment device may further include a hand grip disposed along a length of the extension shaft.

In certain embodiments, the attachment portion may include an eyebolt, a washer, and a spring. In these embodiments, the eyebolt may be connected to the proximal end of the extension shaft. Further, the washer may be located around a length of the eyebolt. Additionally, the spring may surround the eyebolt and be located between the proximal end of the extension shaft and the washer, such that an operator is required to depress the washer against the force of the spring to attach or remove a landscape trimming tool from the attachment device.

The attachment device may further include an attachment bracket configured to attach to the eyebolt of the attachment portion and to a landscape trimming tool. In one embodiment, the attachment bracket has a first clamp portion, a second clamp portion, and at least one securing device. The second clamp portion has a channel that engages with the eyebolt. Additionally, the at least one securing device removably secures the first clamp portion to the second clamp portion, such that the first clamp portion and the second clamp portion are disposed around and retain the landscape trimming tool.

Another embodiment of the present disclosure contemplates a landscape trimming tool attachment device having a curved collar section, a substantially linear extension section, and an attachment portion. The curved collar section has a first end and a second end. The extension section has a proximal end and a distal end. In this embodiment, the extension section distal end is connected to the collar section second end and the attachment portion is connected to the proximal end of the extension section.

In this embodiment, the curved collar section may be integrally formed with the extension section. Alternatively, the curved collar section may be removably connected to the extension section.

Yet another embodiment of the present disclosure contemplates a method of creating a concentric circle in turf surrounding a tree. In particular, the method includes the following steps: providing an attachment device, attaching an attachment portion of the attachment device to a landscape trimming tool, placing a curved collar of the attachment device around the tree, and operating the landscape trimming tool while maintaining tension on the attachment device and circling the tree. In this embodiment, the attachment device may be any of the embodiments disclosed herein, but in particular may have a telescoping extension shaft, a curved collar, and an attachment portion. The telescoping extension shaft may have a proximal end and a distal end. The curved collar may have a first end and a second end. The collar second end may connected to the distal end of the extension shaft and the attachment portion may be connected to the proximal end of the extension shaft.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is a side view of one embodiment of a landscape trimming tool attachment device of the present disclosure;

FIG. 2 is a side view of a second embodiment of a landscape trimming tool attachment device of the present disclosure;

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Figure 3:
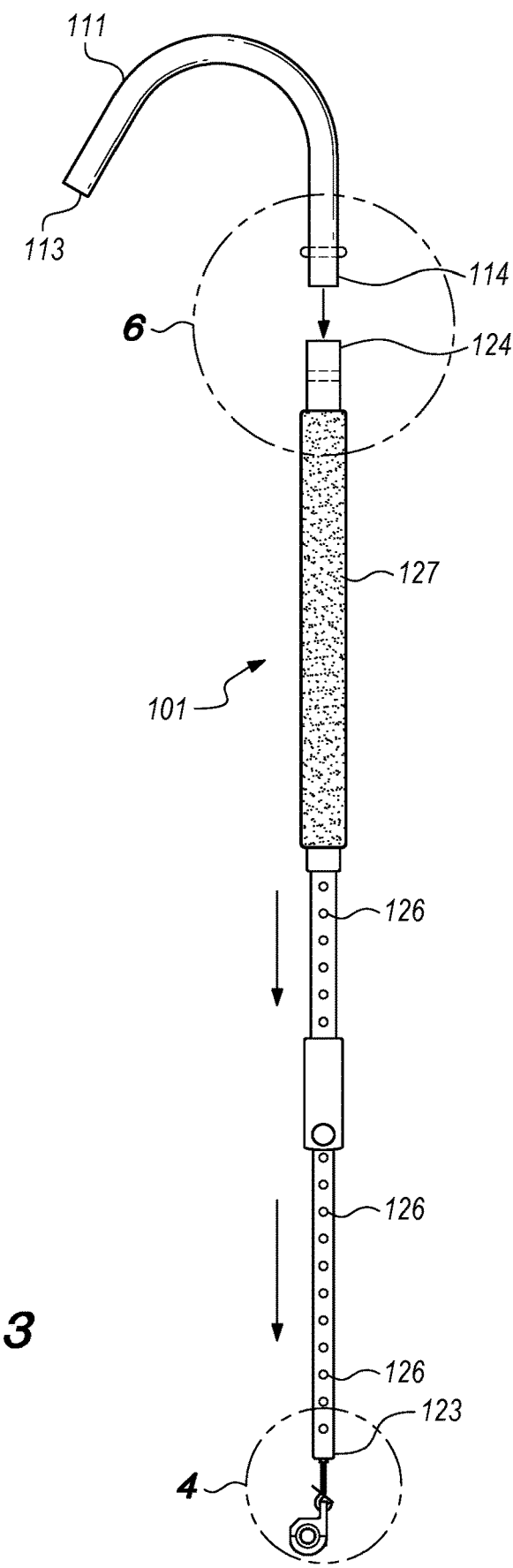
FIG. 3 is a side view of the attachment device shown in FIG. 1 in an extended and disconnected configuration.

As shown in FIG. 1, one embodiment of a landscape trimming tool attachment device 101 is disclosed. The attachment device 101 shown in FIG. 1 is an adjustable version of the present disclosure. In that regard, the adjustable attachment device 101 includes a curved collar 111. The curved collar 111, as best seen in FIG. 3, has a first end 113 and a second end 114, with the collar 111 curving between the two ends 113, 114. The adjustable attachment device 101 further includes a telescoping extension shaft 121 with a proximal end 123 and a distal end 124.

The adjustable attachment device 101 further includes an attachment portion 130 connected to the proximal end 123 of the telescoping extension shaft 121.

Figure 6:
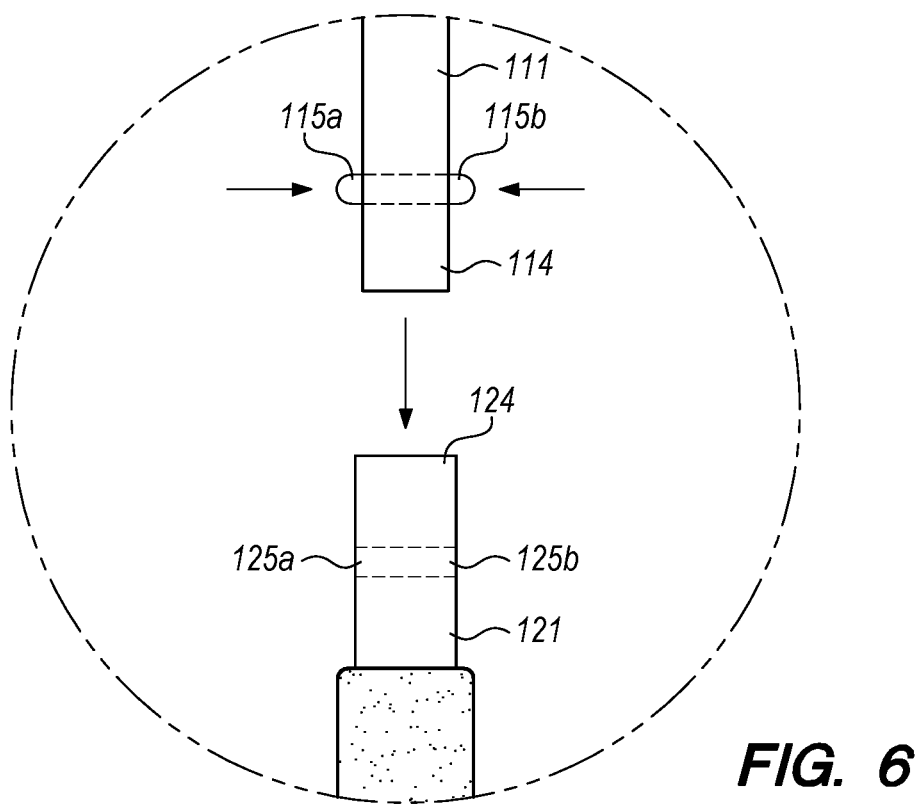
FIG. 6 is a detailed view of the attachment device shown in FIG. 3 with a tree collar separated from the attachment device.

As shown in FIGS. 3 and 6, the second end 114 of the curved collar 111 is configured to be removably connectable to the distal end 124 of the telescoping shaft 121. As shown, the second end 114 of the curved collar 111 fits within the distal end 124 of the telescoping shaft, but any other combination that allows for the curved collar 111 and the telescoping shaft 121 to be connected may be used, for example, that the distal end 124 of the telescoping shaft 121 fits within the second end 114 of the curved collar 111. In order for the telescoping shaft 121 and the curved collar 111 to remain connected, various connecting methods may be utilized. For example, at least one spring-loaded detent 115 may be utilized in combination with at least one notch 125, such that the detent 115 fits within, and is secured by, the notch 125 when the curved collar 111 is connected to the telescoping shaft 121.

As shown in FIG. 6, two detents 115a, 115b may be utilized in combination with two notches 125a, 125b; however, any combination of one or more detents and notches may be utilized, as may other forms of securing methods, such as, but not limited to, thumb screws, clamps, threaded designs, and the like. While FIG. 6 illustrates the detents 115a, 115b being disposed in the curved collar 111 and the notches 125a, 125b being disposed in the telescoping shaft 121, it would likewise be suitable for the detents to be disposed in the telescoping shaft 121 and the notches to be disposed in the curved collar 111.

While it has been discussed above, and shown in FIG. 1, as the curved collar 111 being removably connectable to the extension shaft 121, it is also envisioned that the curved collar 111 could instead be integrally formed with the telescoping extension shaft 121, such that they are one permanent piece.

The telescoping extension shaft 121 is substantially linear along its length between the proximal end 123 and the distal end 124, and is configured such that the telescoping extension shaft 121 is capable of extending linearly as needed by the operator. Any suitable means for extending the telescoping extension shaft may be utilized, including, but not limited to, threaded tubes that may be twisted to lengthen and shorten the shaft 121, tubes of differing sizes that fit within each other and may be extended to lengthen the shaft 121, or various other extending means.

One particular means of extending the shaft 121 is disclosed in U.S. Pat. No. 7,096,530, the entirety of which is incorporated herein by reference. As shown in FIG. 3, the extension shaft 121 may further include a plurality of diameter markers 126 along its length to assist the user in creating or maintaining tree wells of a uniform size. That is, the markers 126 may list various diameters, such that the user can repeatedly create, or maintain, tree wells of a known or set diameter. These markers 126 may merely be visual markings, or they may be a physical locking mechanism to keep the extension shaft 121 at a set diameter.

The extension shaft 121 may further include one or more grips 127 along its length to assist the user in grasping and maneuvering the device 101. The grip 127 may be formed of the same material is the shaft 121, but in a larger configuration to ease with handling, or may be made from a suitable material, such as a foam material, for gripping by the user.

Figure 4:
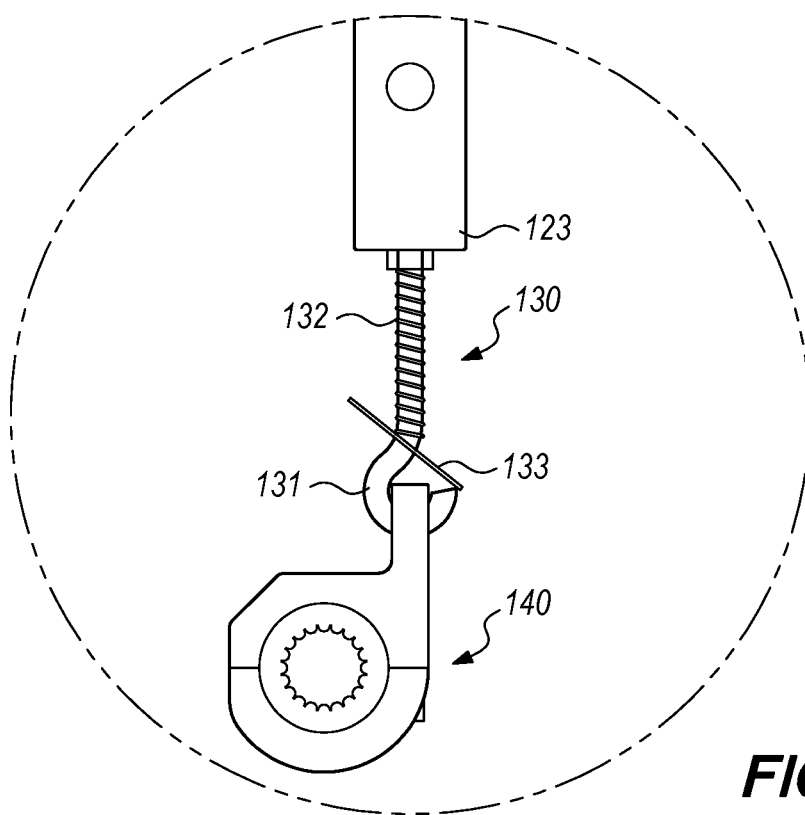
FIG. 4 is a detailed view of an attachment portion of the attachment device shown in FIG. 3 with an attachment bracket attached.
Figure 5:
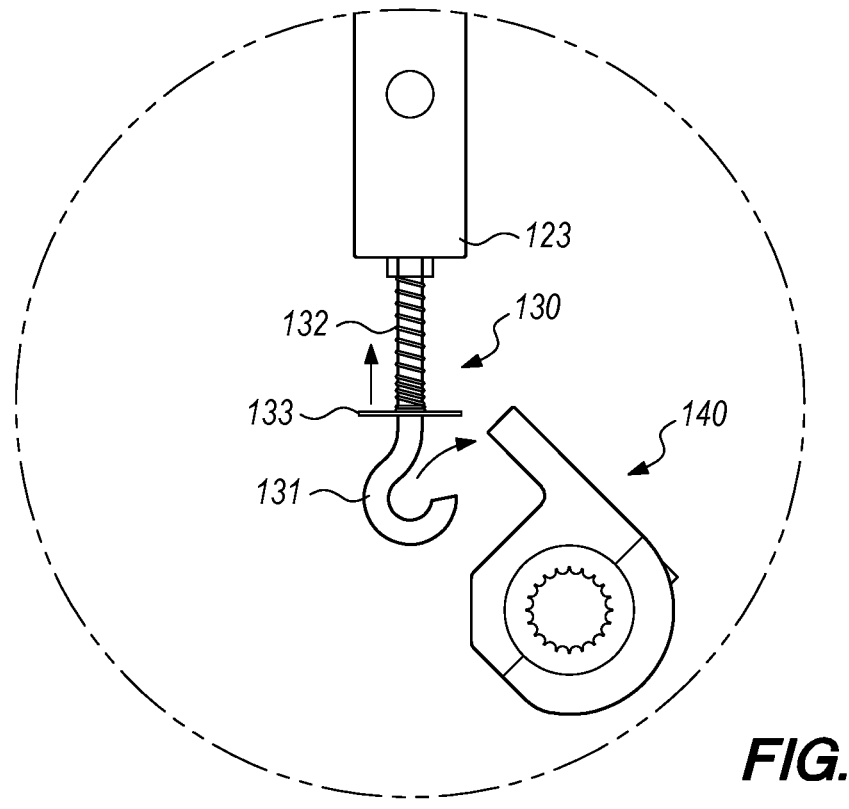
FIG. 5 is a detailed view of the attachment portion shown in FIG. 4 with the attachment bracket detached.

The attachment portion 130 connected to the proximal end 123 of the extension shaft 121 may utilize any suitable means of connection the attachment device 101 to a landscape trimming tool 100, for example, but not limited to, a hook-and-loop strap, a ball-and-socket device, a piece of line, magnets, or the like. The example shown in FIGS. 4 and 5, is a preferred method of connection the attachment device 101 to a landscape trimming tool 100. In this embodiment, the attachment portion 130 includes an eyebolt 131, a spring 132, and a washer 133. The eyebolt 131 is connected to the proximal end 123 of the extension shaft 121, at one end and has an open hook portion at the other end. The spring 132 surrounds a length of the eyebolt 131. Further, the washer 133 is also disposed along the length of the eyebolt 131, with the spring 132 being disposed between the extension shaft 121 and the washer 133, such that when no force is being applied to the spring 132, it pushes the washer 133 up against the hook portion of the eyebolt 131.

A user may apply force to the washer 133 away from the hook portion of the eyebolt 131, thereby compressing the spring 132 and creating a gap which will allow the user to attach or detach a landscape trimming tool 100 to the eyebolt 131. When the force is removed, the washer 133 once again returns to its position against the hook portion of the eyebolt 131, thereby securing the landscape trimming tool 100 to the attachment portion 130. This configuration allows for ease of use in attaching and detaching a tool 100, while requiring a two-pointed application of force to the washer 133 by the user, thereby reducing or eliminating any accidental release of the tool 100 during use.

In combination with the attachment portion 130, there may be utilized an attachment bracket 140 that attaches to the landscape trimming tool 100 and to the attachment portion 130. In particular, the attachment bracket 140 is configured to attach to the eyebolt 131 of the attachment portion 130 and to the landscape trimming tool 100.

Figure 7:
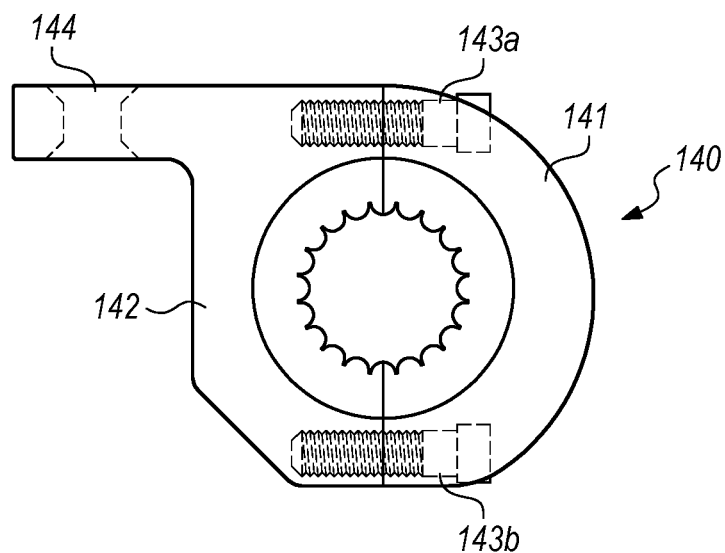
FIG. 7 is a top detailed view of the attachment bracket.

As shown in FIG. 7, one embodiment of the attachment bracket 140 includes a first clamp portion 141, a second clamp portion 142, and at least one securing device 143. In this embodiment, there is a channel 144 disposed through a section of the second clamp portion 142. The hook portion of the eyebolt 131 may be extended through the channel 144 to secure the attachment portion 130 to the attachment bracket 140.

The first clamp portion 141 and the second clamp portion 142 are configured to abut each other, and to surround a portion of the landscape trimming tool 100, thereby keeping the trimming tool 100 in place. The first clamp portion 141 and the second clamp portion 142 are secured to each other by way of at least one securing device 143. As shown in FIG. 7, two securing devices 143a, 143b are utilized. These securing devices 143a, 143b may be screws, bolts, or the like.

FIG. 2 shows a second embodiment of a landscape trimming tool attachment device 102. The attachment device 102 shown in FIG. 2 is a "fixed" or non-adjustable version of the present disclosure. In that regard, the fixed attachment device 102 includes a curved collar section 112, a substantially linear extension section 122, and an attachment portion 130. The curved collar section 112 is a rounded, curved portion having a first end 213 and a second end 214. The extension section 122 is substantially linear and has a proximal end 223 and a distal end 224. The distal end 224 is connected to the collar section second end 214. The attachment portion 130 has been described above in relation to the other embodiment. FIG. 2 shows this embodiment with the curved collar section 112 being integrally formed with the extension section 122 as a single, unified piece; however, it is also envisioned that the curved collar section 112 could be removably attachable, as described more fully in relation to the other embodiment.

Figure 8:
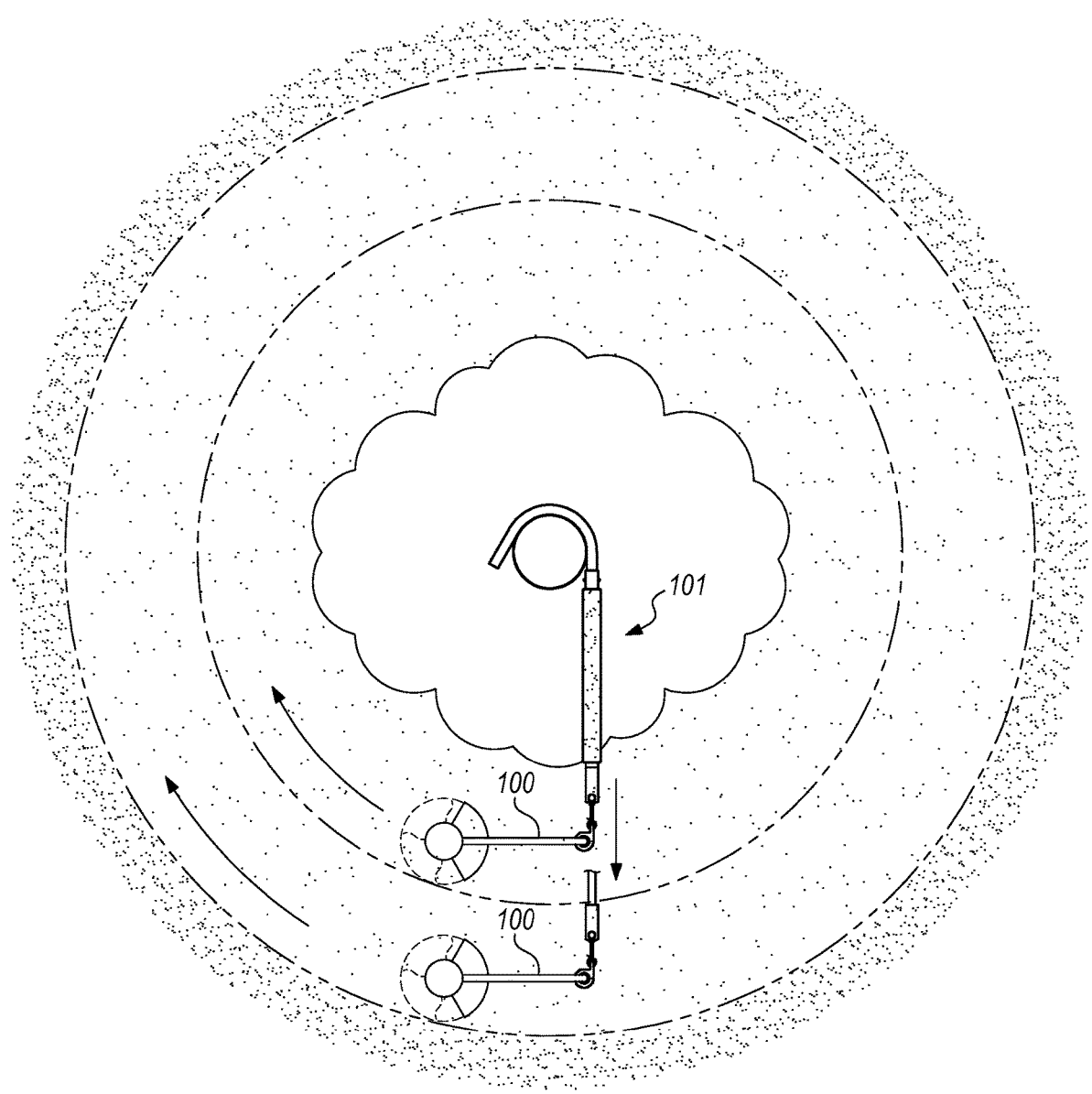
FIG. 8 is a top view showing the attachment device in use around a tree, with a telescoping extension of the attachment device extended to various lengths.

FIG. 8 shows the landscape trimming tool attachment device 101 in use at various diameters set with the telescoping extension shaft 121. In that regard, in order to use the landscape trimming tool attachment device 101, the operator is able to quickly attach it to a landscape trimming tool 100 at the attachment device's proximal end 123 and then the curved collar 111 at the distal end 124 is placed around a base of a tree. As the operator circles the tree, the trimming tool 100 creates a near perfect circle tree well. The attachment device 101 can be quickly adjusted using the telescoping extension shaft 121 to create multiple diameter tree wells with the same attachment device 101 and the curved collar 111 can be quickly changed to accommodate a variety of tree trunk diameters.

Initially, the operator determines the diameter of the tree well and selects the appropriate length extension section if using a non-adjustable attachment device 102 or extends the telescoping extension shaft 121 to the desired diameter if using an adjustable attachment device 101. Then the operator determines the appropriate tree collar size based on the size of the tree's trunk. If using an attachment device with a removable curved collar 111, the operator merely places the correct sized curved collar 111 on the proximal end of the attachment device.

If, however, the operator is using an attachment device with an integrated tree collar section 112, the operator chooses from the appropriate attachment device with the appropriately sized tree collar section 112. To assist in the selection of the appropriate sized collars or shafts, they may be color-coded for the operator's ease. For example, the operator may have a guideline for particular jobs, or particular locations to use a particularly colored collar or attachment device, that coincides with the proper diameter for that particular job or location.

Once the desired selections are made, the operator attaches the attachment device 111 or 112 to the trimming tool 100 and circles the tree. The attachment device may utilize a quick attach and release system, such as the attachment portion 130 and attachment bracket 140 described above. Once the attachment device is attached to the trimming tool 100, the operator simply walks around the tree while keeping tension on the attachment device 100 to form the uniform and circular tree well.

The above description is given by way of example, and not limitation. Given the above disclosure, one skilled in the art could devise variations that are within the scope and spirit of the invention disclosed herein, including various materials from which the attachment device may be formed, as well as various sizes and combinations of curved collars and extension sections. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A landscape trimming tool attachment device comprising:
   a telescoping extension shaft configured to be carried by an operator during operational use; the extension shaft having a proximal end and a distal end;
   a C-shaped curved collar configured to at least partially surround a tree; the curved collar having a first end and a second end, wherein the curved collar second end is connected to the distal end of the extension shaft;
   an attachment portion and attachment bracket configured to connect a landscape trimming tool to the device; the attachment portion and attachment bracket connected to the proximal end of the extension shaft.

2. The landscape trimming tool attachment device of claim 1, wherein the curved collar is removably connected to the telescoping extension shaft.

3. The landscape trimming tool attachment device of claim 2, further comprising at least one detent and at least one notch, wherein the at least one detent is inserted into the at least one notch when the curved collar is connected to the extension shaft.

4. The landscape trimming tool attachment device of claim 3, wherein the at least one detent is disposed in the second end of the curved collar and the at least one notch is disposed in the distal end of the extension shaft.

5. The landscape trimming tool attachment device of claim 4, comprising two detents and two notches.

6. The landscape trimming tool attachment device of claim 1, wherein the curved collar is integrally formed with the telescoping extension shaft.

7. The landscape trimming tool attachment device of claim 1, wherein the telescoping extension shaft further comprises a plurality of diameter markers.

8. The landscape trimming tool attachment device of claim 1, wherein the attachment portion comprises:
   an eyebolt connected to the proximal end of the extension shaft;
   a washer disposed around a length of the eyebolt; and
   a spring surrounding the eyebolt and disposed between the proximal end of the extension shaft and the washer.

9. The landscape trimming tool attachment device of claim 8, wherein the attachment bracket is configured to attach to the eyebolt of the attachment portion and to the landscape trimming tool.

10. The landscape trimming tool attachment device of claim 9, wherein the attachment bracket comprises:
    a first clamp portion;
    a second clamp portion having a channel disposed through a section of the second clamp portion; and
    at least one securing device;
    wherein the at least one securing device removably secures the first clamp portion to the second clamp portion, and wherein the first clamp portion and the second clamp portion are configured to be disposed around and retain the landscape trimming tool.

11. The landscape trimming tool attachment device of claim 1, further comprising a hand grip disposed along a length of the extension shaft.

12. A method of creating a concentric circle in turf surrounding a tree, the method comprising:
    a) providing an attachment device, said attachment device comprising:
       a telescoping extension shaft having a proximal end and a distal end;
       a curved collar having a first end and a second end, wherein the collar second end is connected to the distal end of the extension shaft; and
       an attachment portion connected to the proximal end of the extension shaft;
    b) attaching the attachment portion of the attachment device to a landscape trimming tool;
    c) placing the curved collar around the tree;
    d) operating the landscape trimming tool while maintaining tension on the attachment device and circling the tree.

\* \* \* \* \*